US008020527B2

(12) United States Patent
Mashiki et al.

(10) Patent No.: US 8,020,527 B2
(45) Date of Patent: Sep. 20, 2011

(54) VARIABLE VALVE TIMING SYSTEM

(75) Inventors: Zenichiro Mashiki, Nissin (JP);
Yasumichi Inoue, Toyota (JP); Noboru Takagi, Toyota (JP); Haruyuki Urushihata, Chiryu (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 423 days.

(21) Appl. No.: 12/438,955

(22) PCT Filed: Aug. 29, 2007

(86) PCT No.: PCT/IB2007/002483
§ 371 (c)(1),
(2), (4) Date: Feb. 26, 2009

(87) PCT Pub. No.: WO2008/026041
PCT Pub. Date: Mar. 6, 2008

(65) Prior Publication Data
US 2010/0012061 A1    Jan. 21, 2010

(30) Foreign Application Priority Data
Aug. 31, 2006 (JP) .................................. 2006-235907

(51) Int. Cl.
F01L 1/34 (2006.01)
(52) U.S. Cl. ............... 123/90.15; 123/90.11; 123/90.17; 251/129.01

(58) Field of Classification Search ............... 123/90.11, 123/90.15, 90.17, 90.16, 90.18; 251/129.01
See application file for complete search history.

(56) References Cited

U.S. PATENT DOCUMENTS

| 5,218,935 | A | 6/1993 | Quinn, Jr. et al. |
| 7,146,944 | B2 * | 12/2006 | Tani et al. ................. 123/90.15 |
| 2005/0081808 | A1 | 4/2005 | Tani et al. |
| 2005/0252469 | A1 | 11/2005 | Neubauer et al. |

FOREIGN PATENT DOCUMENTS

| DE | 43 40 614 | 6/1995 |
| DE | 101 16 707 | 10/2002 |
| JP | 5 104978 | 4/1993 |
| JP | 2004 190663 | 7/2004 |
| JP | 2005-133708 A | 5/2005 |
| JP | 2006-70754 A | 3/2006 |
| WO | 2006 122665 | 11/2006 |

* cited by examiner

Primary Examiner — Ching Chang
(74) Attorney, Agent, or Firm — Oblon, Spivak, McClelland, Maier & Neustadt, L.L.P.

(57) ABSTRACT

A valve timing control is executed by an ECU that controls an engine and an electric-motor ECU that controls an electric motor. The ECU and the electric-motor EDU serve different functions. The ECU sets the target phase of an intake valve based on the engine operating state, and prepares a rotational speed command value for the electric motor that serves as an actuator such that a phase feedback control loop, in which the intake valve phase is caused to match the target phase, is formed. The electric-motor EDU forms a feedback control loop for the motor speed, in which the electric power supplied to the electric motor is controlled such that the electric motor rotates in accordance with the rotational speed command value.

5 Claims, 12 Drawing Sheets

VARIABLE VALVE TIMING SYSTEM

BACKGROUND OF THE INVENTION

1. Field of the Invention

The invention relates generally to a variable valve timing system, and, more specifically, to a variable valve timing system that uses an electric motor as an actuator.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

With, especially, a variable valve timing system that hydraulically drives a camshaft, the variable valve timing control is sometimes not executed as accurately as it should be, in a cold environment or at the time of engine starting. Such inconvenience is caused because the hydraulic pressure used to drive the camshaft is insufficient or the response of the camshaft to the hydraulic control is slow in such occasions. To obviate such inconveniences, a variable valve timing system that drives a camshaft by means of an electric motor has been suggested, as described in, for example, Japanese Patent Application Publication No. JP-05-104978 (JP-A-05-104978), US Patent Application Publication No. US2005/0252469A1, Japanese Patent Application Publication No. JP-2004-190663 (JP-A-2004-190663).

JP-A-05-104978 describes a variable valve timing system that uses a step motor as an actuator. The described variable valve timing system is provided with a VVT ECU (Electronic Control Unit) that controls the variable valve timing system in addition to an engine ECU that controls an engine. The VVT ECU operates independently of the engine ECU. US Patent Application Publication No. US2005/0252469A1 describes a system (i.e.; a variable valve timing control system) that controls the rotational angle of a camshaft with respect to a crankshaft, using a motor as an actuator. The described system is provided with a control unit for an electric motor that serves as an actuator for the variable valve timing system (i.e., a control unit for the variable valve timing system), in addition to an engine control element. The control unit for the electric motor operates independently of the engine control element.

JP-A-2004-190663 describes a variable valve timing system that changes the valve timing by changing the motor speed with respect to the rotational speed of a camshaft.

However, in the system described in JP-A-05-104978, the VVT ECU calculates an appropriate amount of valve overlap, namely, the appropriate valve timing, upon reception of a signal indicating the operating state of the engine, and also, outputs a control signal for the step motor to achieve the appropriate valve timing. The VVT ECU produces a signal used to select a magnetizing coil of the step motor. Accordingly, the VVT ECU serves many functions including setting of the target value of the valve timing and creation of a control signal which is used to control the step motor to execute the valve timing control appropriately. This increases the processing load placed on the VVT ECU, which is designed to execute software processing by executing a program. Therefore, the processing power of the ECU needs to be increased to control the variable valve timing at a higher speed.

With the system described in US Patent Publication US2005/0252469A1, a signal indicating the rotational angle of the crankshaft and a signal indicating the rotational angle of the camshaft are transmitted to the variable valve timing control unit. The variable valve timing control unit executes a feedback control to match the actual valve timing with the desirable valve timing. This may increase in the processing load placed on the control unit for the variable valve timing system, as in the case of the variable valve timing system described in Japanese Patent Application Publication No. JP-A-05-104978.

According to JP-A-2004-190663, an ECU, which serves as an engine control circuit, calculates the target valve timing and the actual valve timing, and calculates a motor control value (for example, the voltage applied to the motor and value of the final duty ratio for the motor) based on the deviation of the actual valve timing from the target valve timing. In such a configuration, the processing load placed on the ECU that executes the engine control excessively increases. In JP-A-2004-190663, the ECU is designed to execute software processing. Therefore, the processing power of the ECU needs to be increased to control the variable valve timing at a higher speed.

Furthermore, in variable valve timing control described in the above publications, the feedback loop of the valve timing phase control (the control over the position of the valve) is formed for the total system including even the motor control. Accordingly, the control speed may be increased if refinements are introduced to the configuration of the feedback loop.

SUMMARY OF THE INVENTION

The invention provides a variable valve timing system that has a control configuration which increases a control speed without excessively increasing the processing load placed on each controller.

An aspect of the invention relates to a variable valve timing system that changes opening/closing timing of at least one of an intake valve and an exhaust valve provided in an engine, and that includes a changing mechanism, a first sensor, a second sensor, a first controller, and a second controller. The changing mechanism changes the opening/closing timing of the valve by an amount of change corresponding to the rotational speed of an electric motor that is used as an actuator relative to the rotational speed of a camshaft that drives the valve. The first sensor detects the rotational speed of the camshaft. The second sensor detects the rotational speed of the electric motor. The first controller calculates a current value of the opening/closing timing of the valve based on at least a signal from the first sensor and a signal from the second sensor, and prepares a rotational speed command value for the electric motor based on the deviation of the current value of the opening/closing timing from a target value of the opening/closing timing, which is set based on the operating state of the engine, such that the opening/closing timing changes in accordance with the target value. The second controller receives a signal indicating the rotational speed command value from the first controller, and controls the electric power supply to the electric motor based on the rotational speed of the electric motor, which is detected by the second sensor, such that the electric motor operates in accordance with the rotational speed command value.

With the variable valve timing system according to the first aspect of the invention, the first controller executes the feedback control over the valve phase, while the second controller controls the rotational speed of the actuator. Thus, it is possible to execute the valve timing control at a high speed by controlling the electric motor, which serves as an actuator, at a high speed without complicating the functions of the controllers or excessively increasing the processing load placed on the controllers.

In the first aspect of the invention, the second controller may control the rotational speed of the electric motor by executing, in combination, a setting control based on the rotational speed command value set by the first controller and a feedback control based on the deviation of the actual rotational speed of the electric motor from the rotational speed command value.

In the first aspect of the invention, the second controller may include an electric power conversion circuit, a first setting unit, a second setting unit, and a drive unit. The electric power conversion circuit controls the electric power supply to the electric motor. The first setting unit sets an adjustment amount by which the amount of electric power supplied to the electric motor is controlled based on the deviation of the rotational speed of the electric motor, which is detected by the second sensor, from the rotational speed command value indicated by the signal from the first controller. The second setting unit sets an adjustment amount in accordance with the rotational speed command value indicated by the signal from the first controller based on a predetermined characteristic. The drive unit prepares a control signal for the electric power conversion circuit based on the sum of the adjustment amount set by the first setting unit and the adjustment amount set by the second setting unit.

With this configuration, the motor speed control is executed using both the feedback term used in the first setting unit and the preset term used in the second setting unit in combination. In this way, the rotational speed of the electric motor is caused to match the rotational speed command value, even if it changes, more promptly than in a simple feedback control, namely, the rotational speed control executed using only the feedback term used in the first setting unit.

In the first aspect of the invention, the second controller may be formed integrally with the electric motor and include the second sensor. Also, the first controller may receive the signal indicating the rotational speed of the electric motor from the second sensor via a signal line that extends from the first controller to the second controller.

Thus, the space in which the sensors are arranged is reduced to reduce the size of the system. In the first aspect of the invention, the first controller may be formed of an electronic control unit that has a function of executing a program to control the engine.

The aspect of the invention provides the variable valve timing system having the control configuration which increases a control speed without excessively increasing the processing load placed on each controller.

BRIEF DESCRIPTION OF THE DRAWINGS

The foregoing and further objects, features and advantages of the invention will become apparent from the following description of an embodiment with reference to the accompanying drawings, wherein the same or corresponding elements will be denoted by the same reference numerals and wherein.

DETAILED DESCRIPTION OF THE EMBODIMENT

Figure 1:
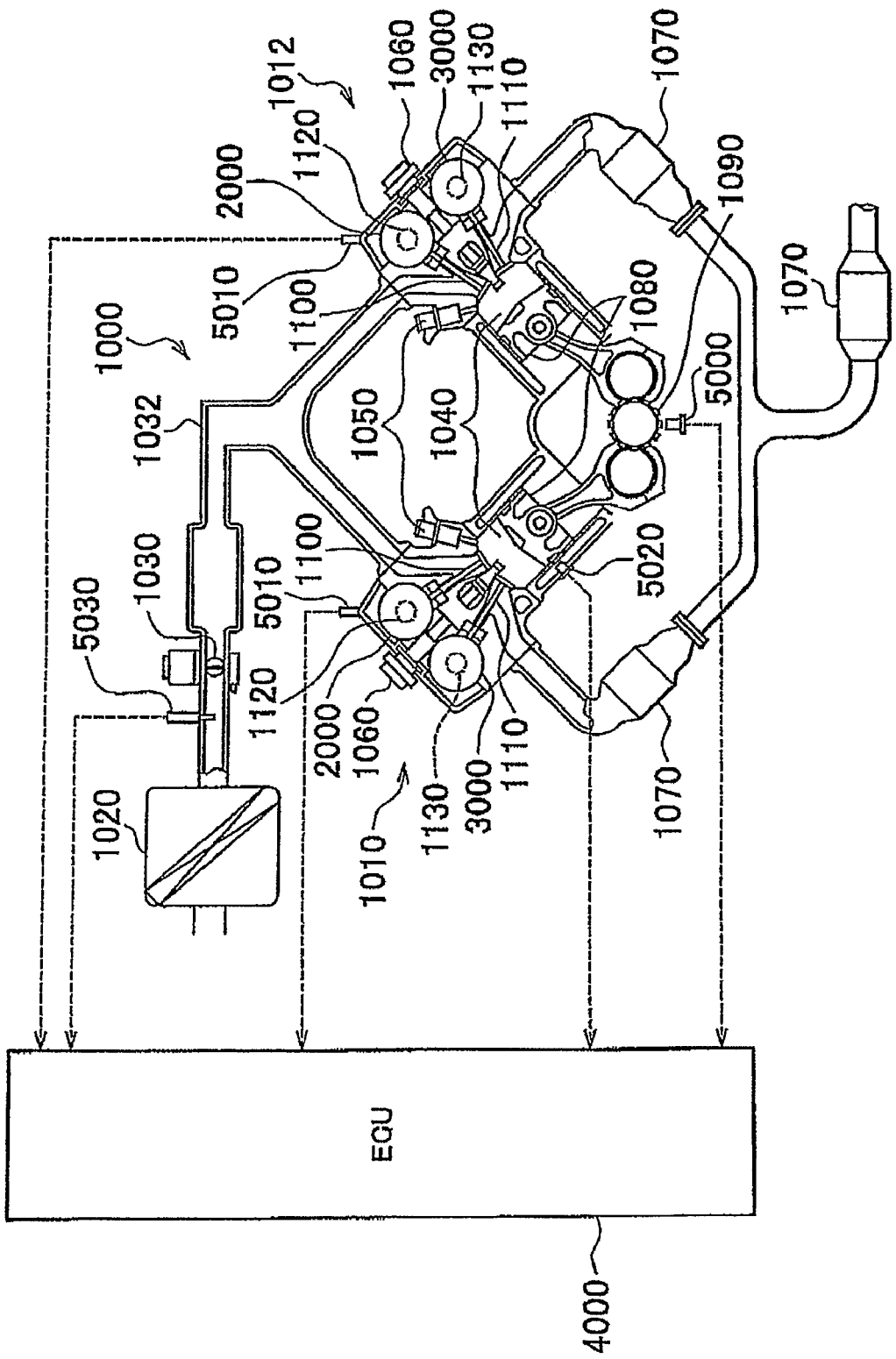
FIG. 1 is a view schematically showing the structure of a vehicle engine provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

First, a vehicle engine provided with a variable valve timing system according to the embodiment of the invention will be described with reference to FIG. 1.

An engine 1000 is an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
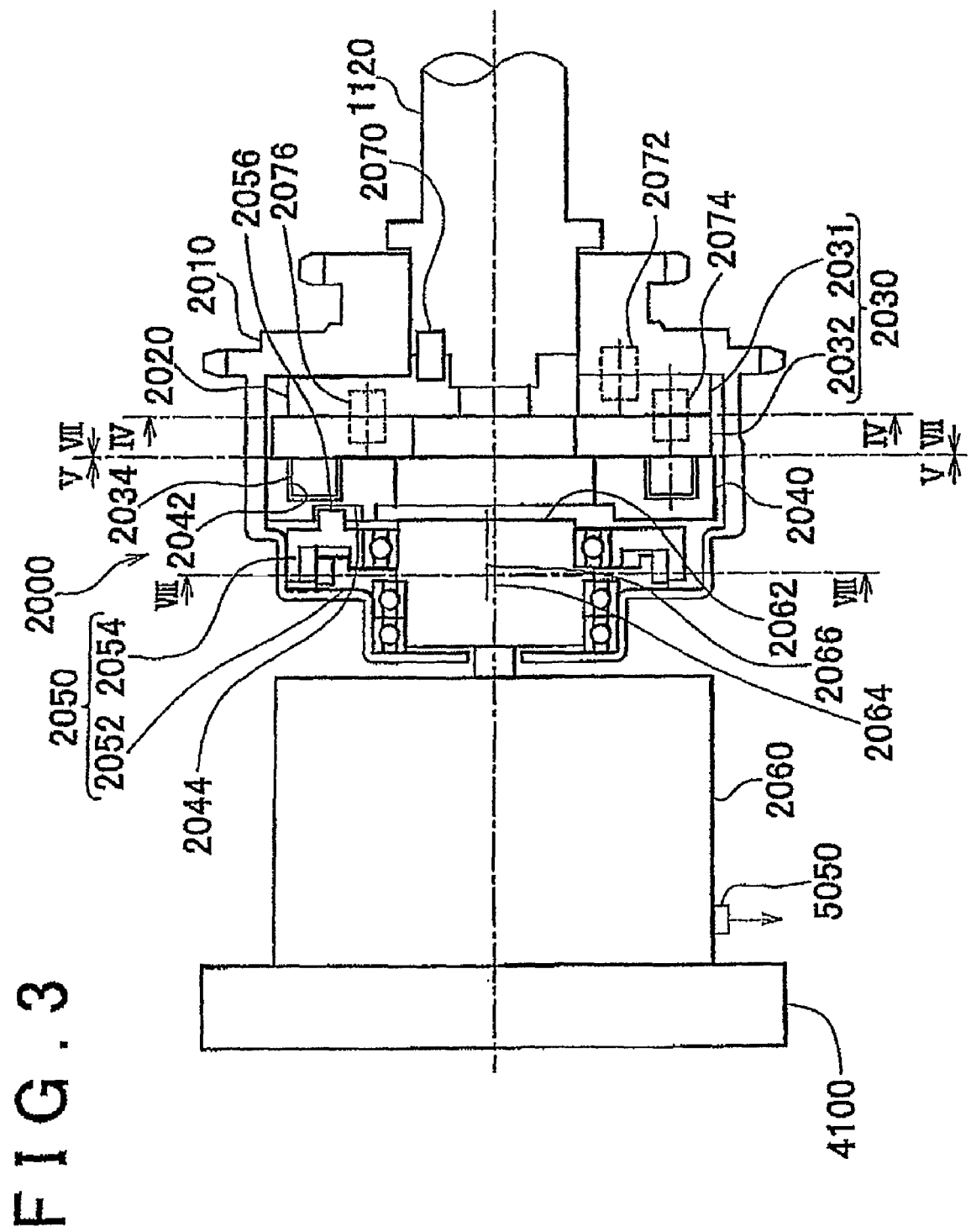
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

Figure 2:
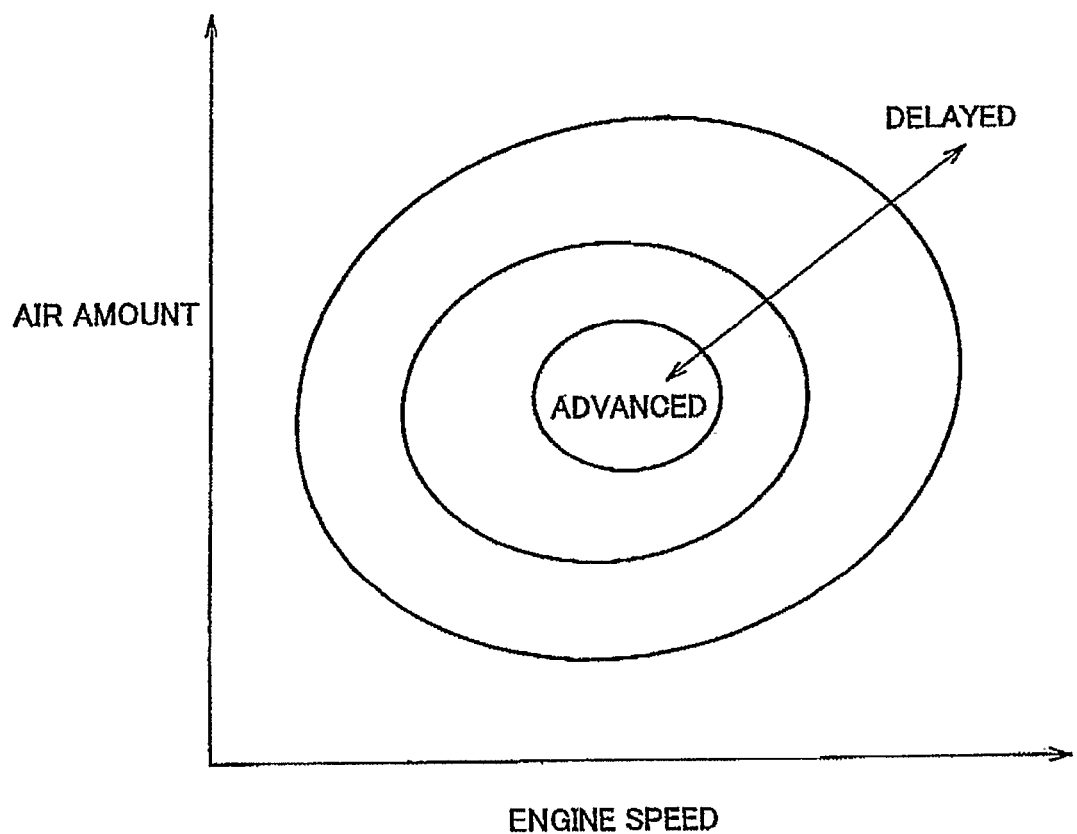
FIG. 2 is a graph showing the map that defines the phase of an intake camshaft.

According to the embodiment of the invention, the ECU 4000 sets the target phase of the intake valve 1100 based on the map that uses parameters indicating the engine operating state, typically, the map that uses the engine speed NE and the intake air amount KL as parameters, as shown in FIG. 2. Generally, multiple maps, used to set the phase of the intake valve 1100 at multiple coolant temperatures, are stored in the memory.

Hereafter, the intake VVT mechanism 2000 will be described in more detail. Note that, the exhaust VVT mechanism 3000 may have the same structure as the intake VVT mechanism 2000 described below. Alternatively, each of the intake VVT mechanism 2000 and the exhaust VVT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060. An electric-motor EDU 4100 used to control the electric motor 2060 is formed integrally with the electric motor 2060. The electric motor 2060 and the electric-motor EDU 4100 may be housed in the same case. Alternatively, the electric motor 2060 and the electric-motor EDU 4100 may be accommodated in the individual cases, and then connected to each other.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
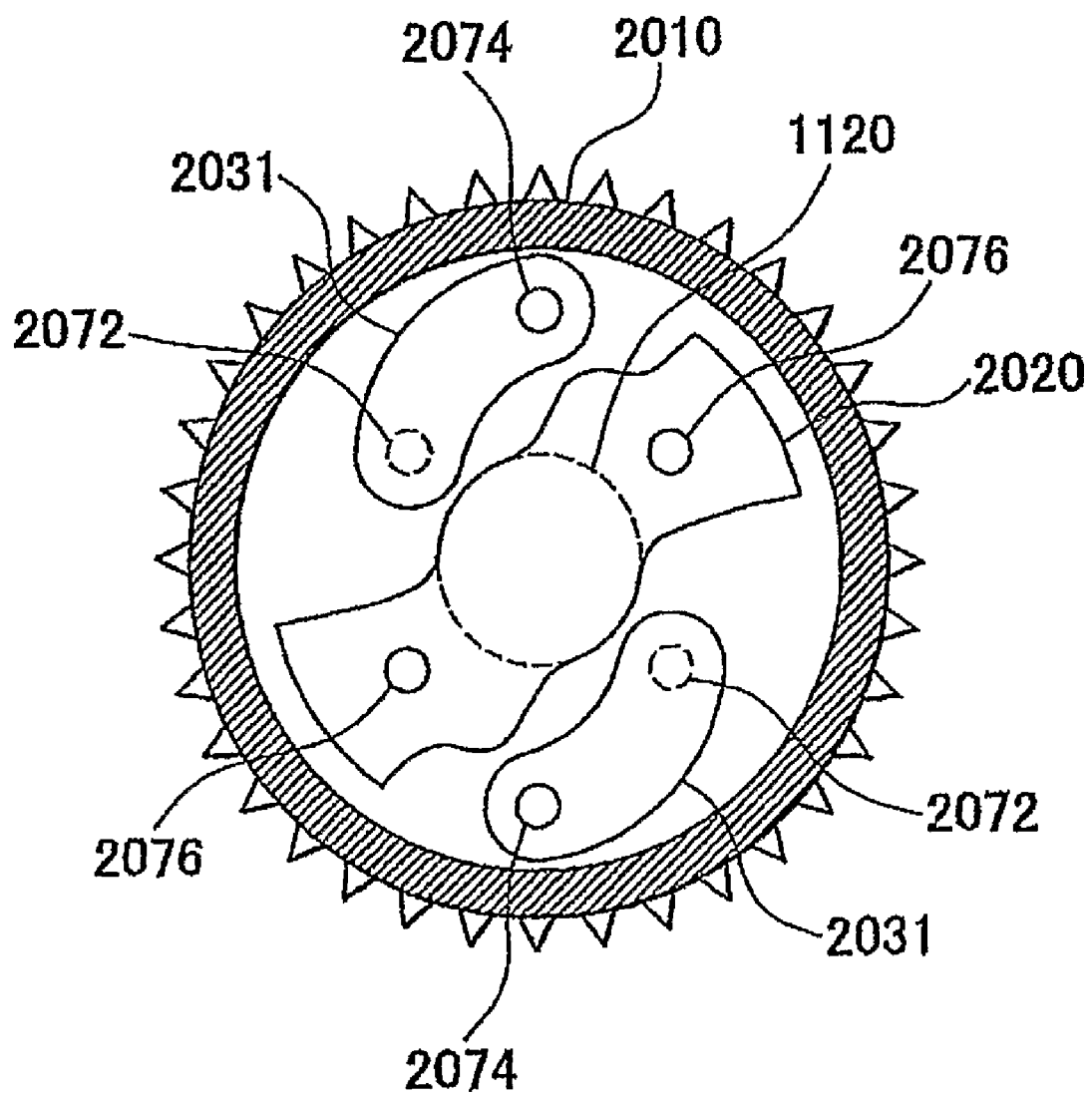
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the intake camshaft 1120. Each first arm 2031 is connected to the sprocket 2010 so as to pivot about a second pin 2072.

Figure 5:
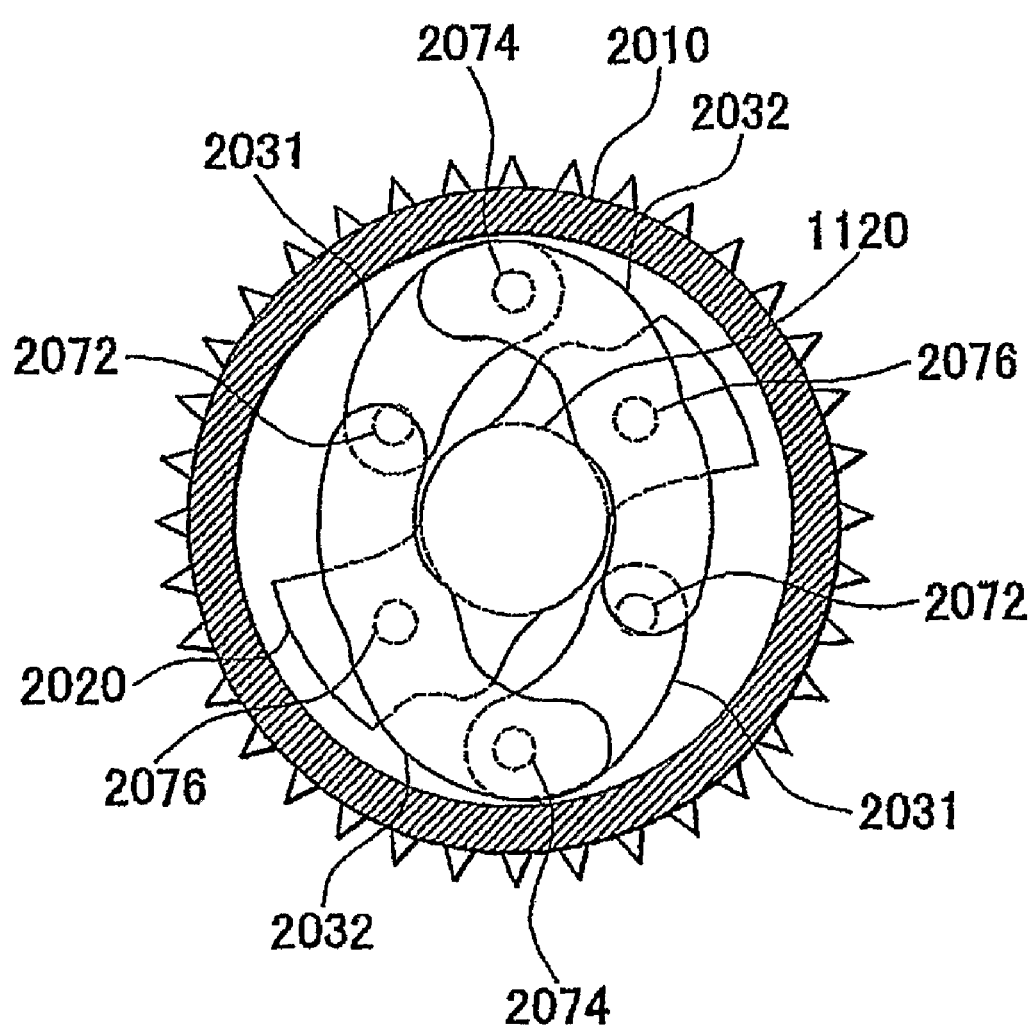
FIG. 5 is a first cross-sectional view taken along the line V-V in FIG. 3.
Figure 6:
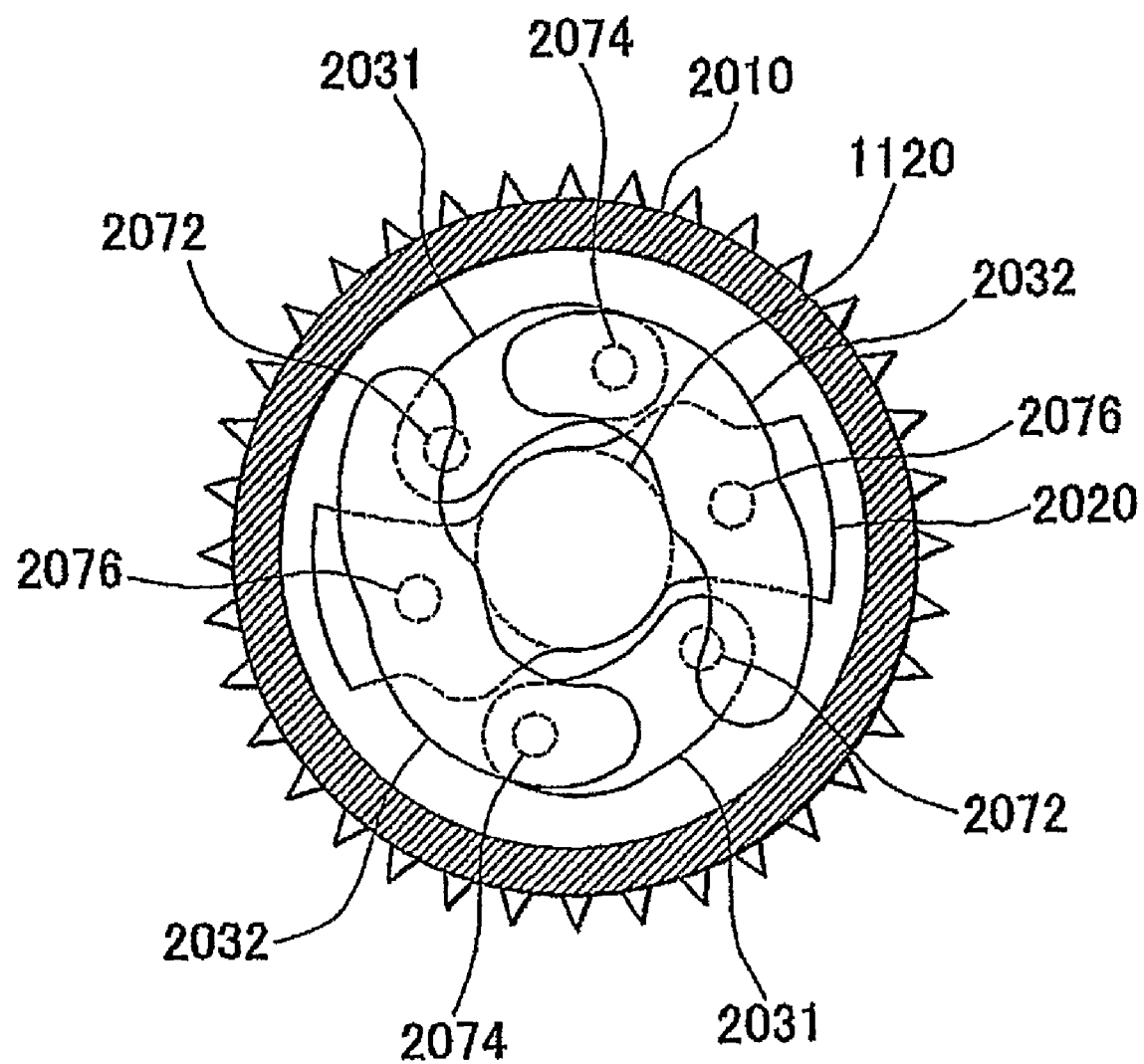
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 1100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2034 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
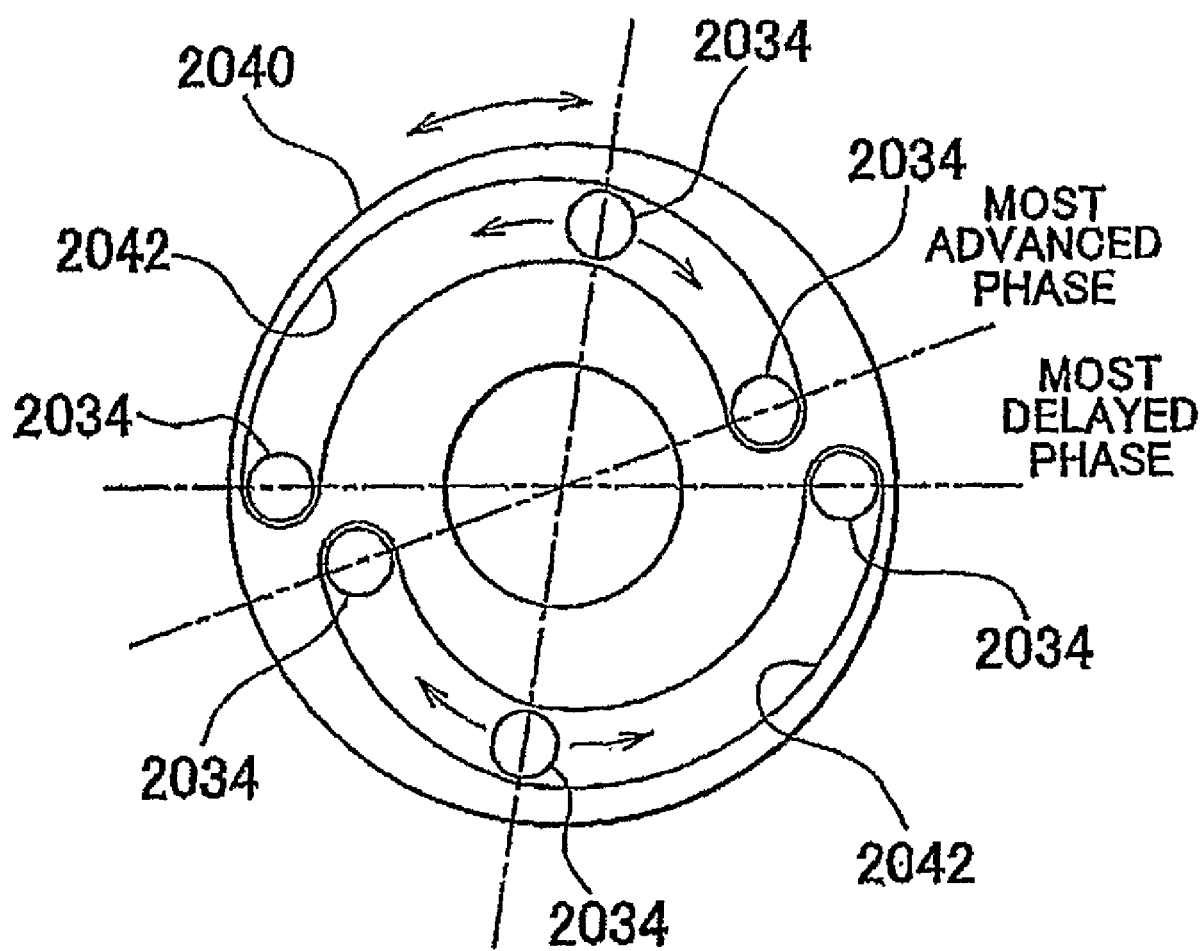
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
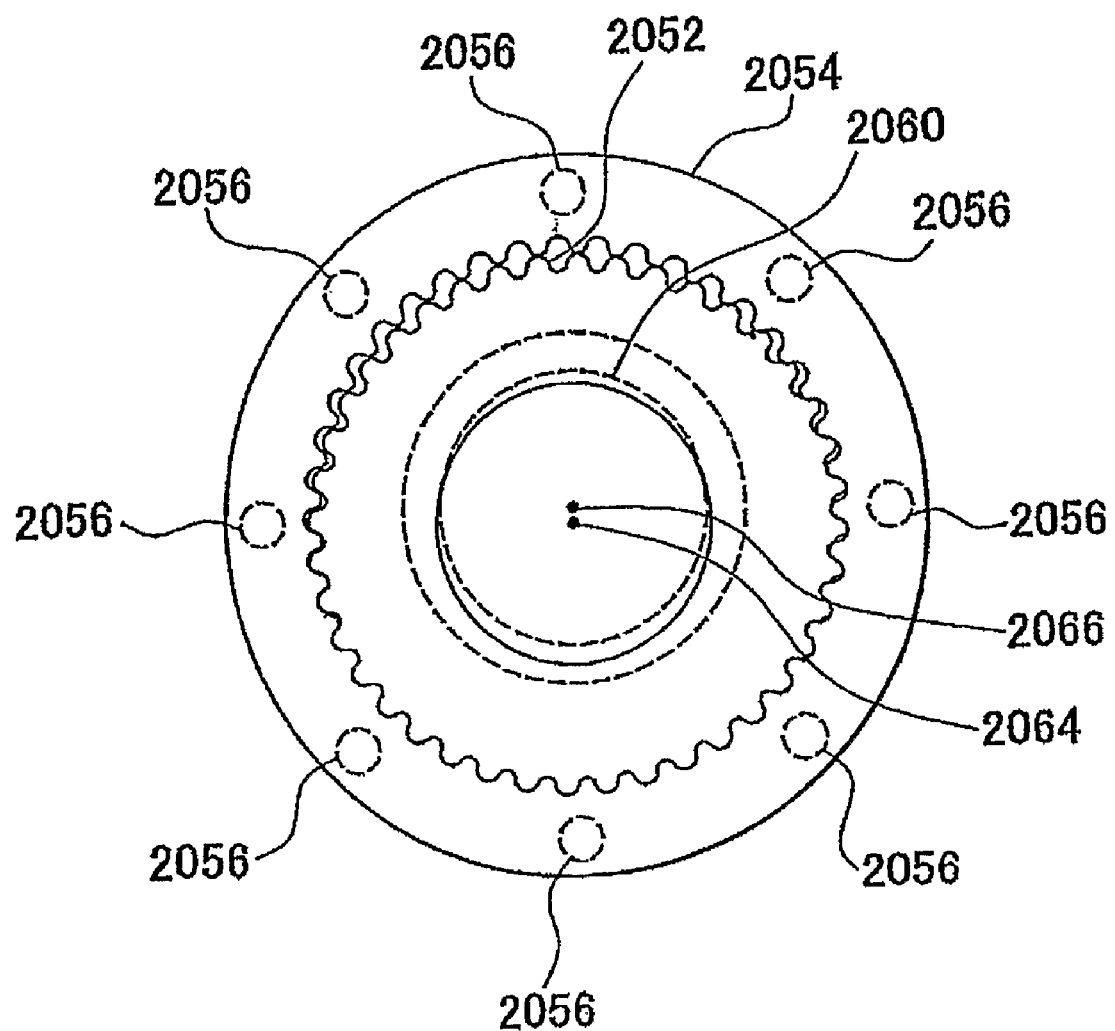
FIG. 8 is a cross-sectional view taken along the line VIII-VIII in FIG. 3.

FIG. 8 shows a cross-sectional view taken along the line VIII-VIII in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030.

Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" where appropriate) is detected based on the signal output from the motor rotational angle sensor 5050.

Figure 9:
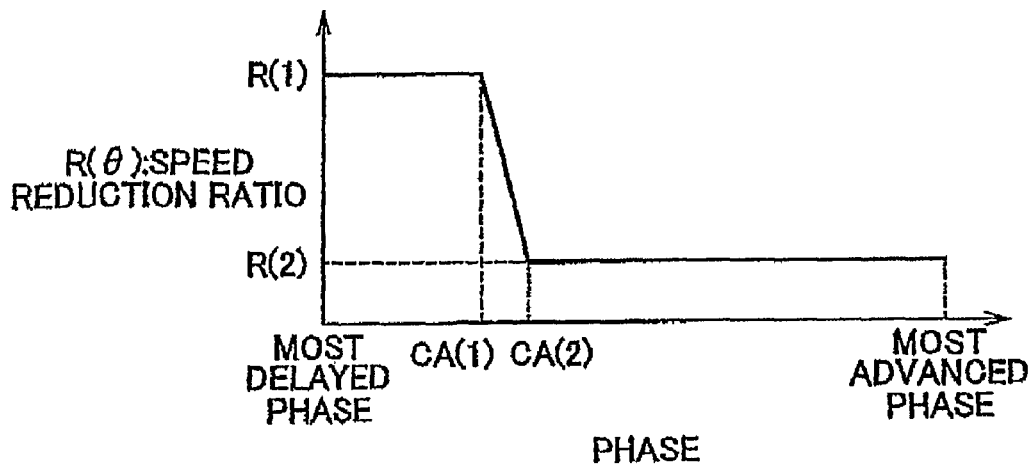
FIG. 9 is a graph showing the speed reduction ratio that the elements of the intake VVT mechanism realize in cooperation.

As shown in FIG. 9, the speed reduction ratio $R(\theta)$ that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within the first region that extends from the most delayed phase to CA1, the speed reduction ratio that the elements of the intake VVT mechanism 2000 realize in cooperation is R1. When the phase of the intake valve 1100 is within the second region that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within the third region that extends from CA1 to CA2, the speed reduction ratio that the elements of the intake VVT mechanism 2000 realize in cooperation changes at a predetermined rate ((R2−R1)/(CA2−CA1)).

The effects of the thus configured intake VVT mechanism 2000 of the variable valve timing system according to the embodiment of the invention will be described below.

Figure 10:
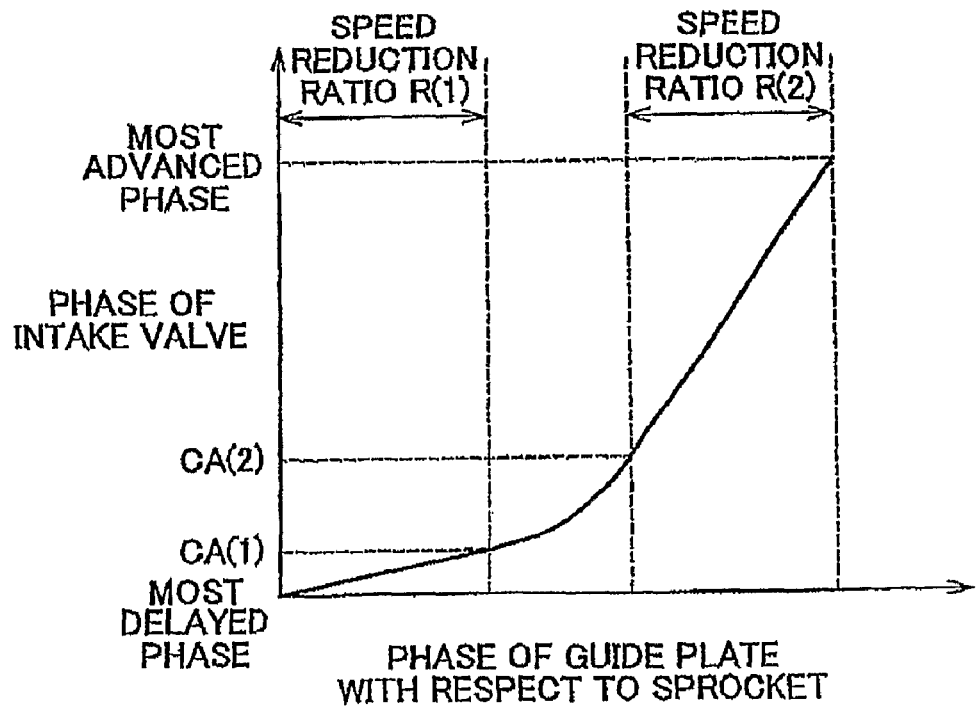
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the first region that extends from the most delayed phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the first region that extends from the most delayed phase to CA1, the relative rotational speed between the output shaft of the electric motor 2060 and the sprocket 2010 is reduced at the speed reduction ratio R1. As a result, the phase of the intake valve 1100 is delayed. When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase of the intake valve 1100 is delayed.

Accordingly, as long as the direction of the relative rotation between the output shaft of the electric motor 2060 and the sprocket 2010 remains unchanged, the phase of the intake valve 1100 may be advanced or delayed in both the first region that extends from the most delayed phase to CA1 and the second region that extends from the CA2 to the most advanced phase. In this case, in the second region that extends from CA2 to the most advanced phase, the phase is advanced or delayed by an amount larger than that in the first region that extends from the most delayed phase to CA1. Accordingly, the second region is broader in the phase change width than the first region.

In the first region that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is not operating, the rotation of the output shaft of the electric motor 2060, which is caused by the torque applied to the intake camshaft 1120, is restricted. This restricts the deviation of the actual phase from the phase used in the control. In addition, occurrence of an undesirable phase change is restricted when the supply of electric power to the electric motor 2060 that serves as the actuator is stopped.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is brought into a state in which combustion stably takes place in the engine 1000.

When the phase of the intake valve 1100 is within the third region that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the first region to the second region, or from the second region to the first region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

With the intake VVT mechanism 2000 of the variable valve timing system the embodiment of the invention, when the phase of the intake valve 1100 is within the first region that extends from the most delayed phase to CA1, the speed reduction ratio that the elements of the intake VVT mechanism 2000 realize in cooperation is R1. When the phase of the intake valve 1100 is within the second region that extends from CA2 to the most advanced phase, the speed reduction ratio that the elements of the intake VVT mechanism 2000 realize in cooperation is R2 that is lower than R1 (R1>R2). Accordingly, as long as the direction of the relative rotation between the output shaft of the electric motor 2060 and the sprocket 2010 remains unchanged, the phase of the intake valve 1100 may be advanced or delayed in both the first region that extends from the most delayed phase to CA1 and the second region that extends from the CA2 to the most advanced phase.

In this case, in the second region that extends from CA2 to the most advanced phase, the phase is advanced or delayed by an amount larger than that in the first region that extends from the most delayed phase to CA1. Accordingly, the second region is broader in the phase change width than the first region.

In the first region that extends from the most delayed phase to CA1, the speed reduction ratio is high. Accordingly, it is possible to restrict the rotation of the output shaft of the electric motor 2060, which is caused by the torque applied to the intake camshaft 1120 in accordance with the operation of the engine 1000. This restricts the deviation of the actual phase from the phase used in the control. As a result, it is possible to change the phase by a large amount, and to control the phase accurately.

Figure 11:
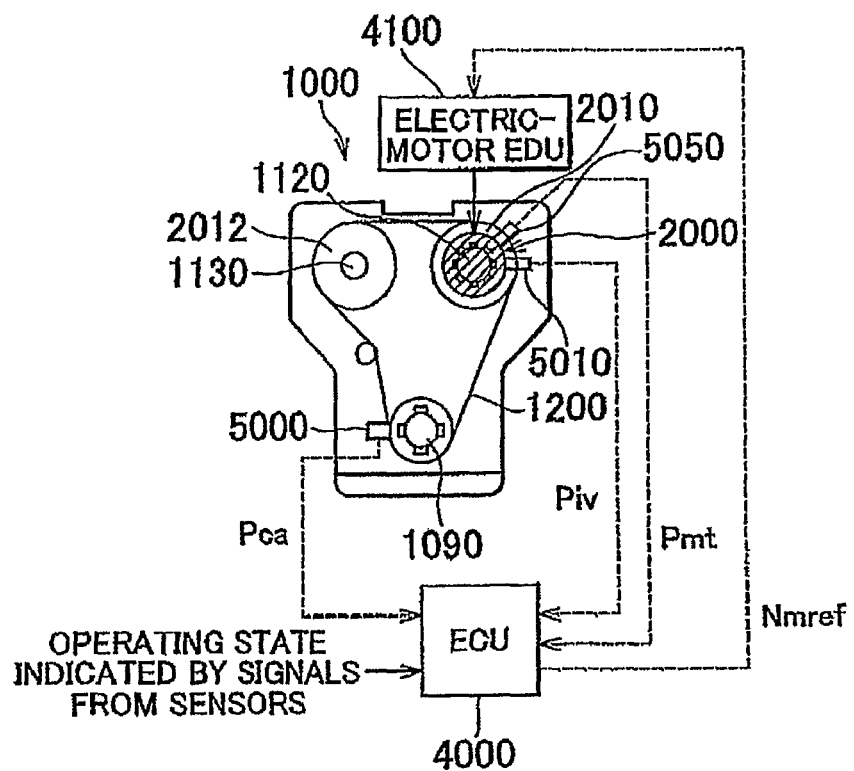
FIG. 11 is a schematic block diagram illustrating the configuration of the control over the phase of an intake valve, executed by the variable valve timing system according to the embodiment of the invention.

FIG. 11 is a schematic block diagram illustrating the configuration of the control over the phase of the intake valve 1100, executed by the variable valve timing system according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to the electric motor 2060. These cam angle signal Piv, crank angle signal Pca and motor rotational angle signal Pmt are transmitted to the ECU 4000.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 produces a required output power. As part of the engine control, the ECU 4000 sets the target value of the phase of the intake valve 1100 and the target value of the phase of the exhaust valve 1110 based on the map shown in FIG. 2. In addition, the ECU 4000 prepares the rotational speed command value Nmref for the electric motor 2060 that serves as the actuator for the intake VVT mechanism 2000. If the electric motor 2060 rotates at the rotational speed command value Nmref, the phase of the intake valve 1100 matches the target value (target phase). The rotational speed command value Nmref is set based on the relative rotational speed between the output shaft of the electric motor 2060 and the sprocket 2010 (the intake camshaft 1120), which corresponds to the operation amount of the actuator, as described in detail below.

The electric-motor EDU (Electronic Drive Unit) 4100 controls the rotational speed of the electric motor 2060 based on the rotational speed command value Nmref indicated by a signal from the ECU 4000.

Figure 12:
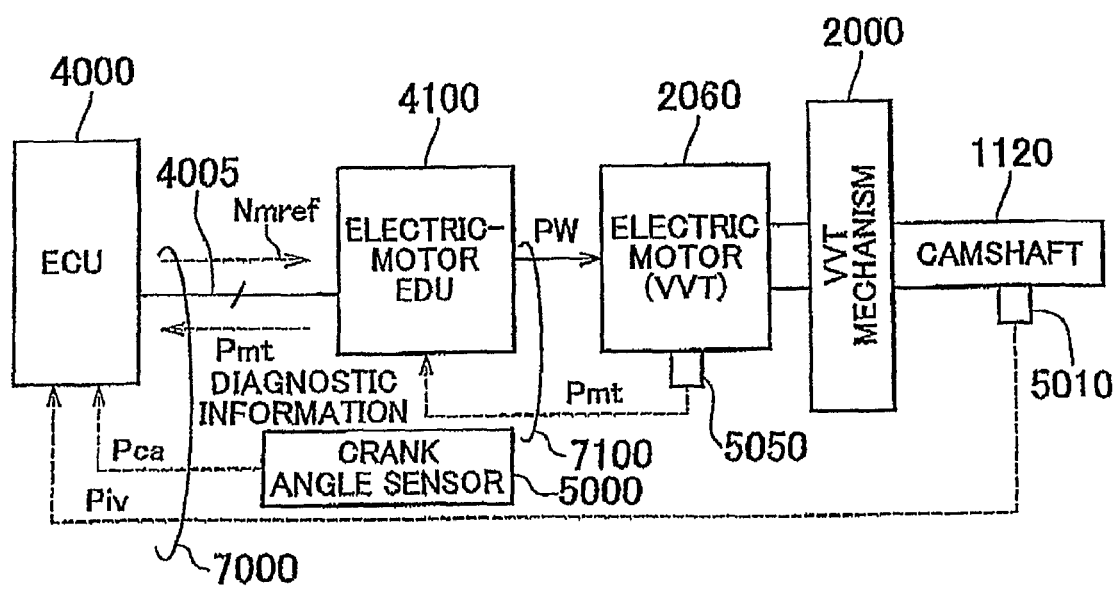
FIG. 12 is a schematic block diagram illustrating formation of the feedback control loop in the control configuration shown in FIG. 11.

In the intake valve phase control executed by the variable valve timing system according to the embodiment of the invention, a feedback control loop 7000 for the intake valve phase is formed by the ECU 4000, as shown FIG. 12. In the feedback control loop 7000, the ECU 4000 detects the phase of the intake valve 1100 and matches the intake valve phase with the target phase. The electric-motor EDU 4100 forms a feedback control loop 7100 for the motor speed. In the feedback control loop 7100, the electric power PW supplied to the electric motor 2060 is controlled such that the rotational speed of the electric motor 2060 matches the rotational speed command value Nmref indicated by a signal from the ECU 4000. More specifically, the electric-motor EDU 4100 forms the feedback control loop 7100 as a minor loop which is a part of the total feed back control loop 7000.

In addition, when the electric-motor EDU 4100 is formed integrally with the electric motor 2060 as shown in FIG. 3, the motor rotational angle sensor 5050 formed of a hall element, etc. may be arranged in the electric-motor EDU 4100. In this way, the size of the intake VVT mechanism 2000 is reduced. The motor rotational angle signal Pmt from the rotational angle sensor 5050 and the diagnostic information which indicates an unusual condition of the motor rotational angle signal Pmt due to, for example, breaking of wire are transmitted to the ECU 4000 through a signal line 4005 which extends from the ECU 4000 to the electric-motor EDU 4100.

Figure 13:
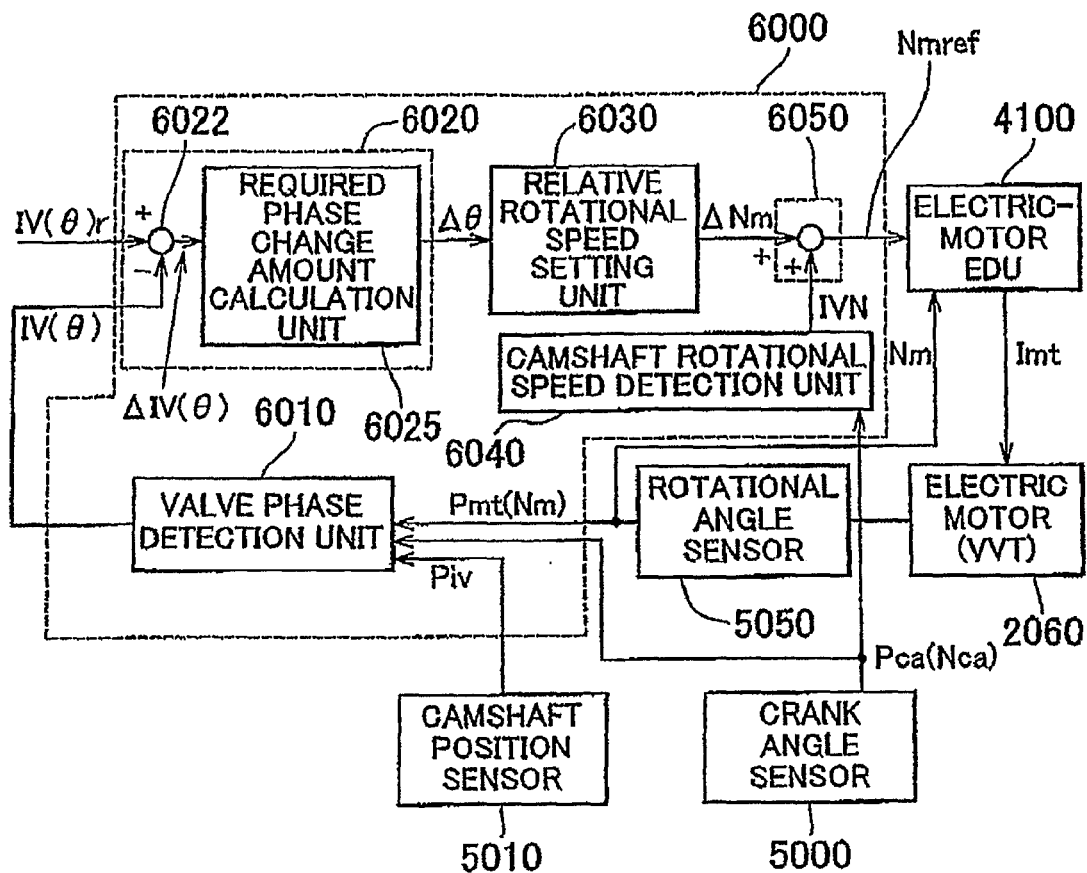
FIG. 13 is a functional block diagram illustrating the feedback control executed by an ECU over the phase of the intake valve.

FIG. 13 is a functional block diagram illustrating the feedback control which is executed by the ECU 4000 over the intake valve phase.

As shown in FIG. 13, an actuator operation amount setting unit 6000, which executes the feedback control over the intake valve phase, includes a valve phase detection unit 6010; a camshaft phase change amount calculation unit 6020; a relative rotational speed setting unit 6030; a camshaft rotational speed detection unit 6040; and a rotational speed command value preparation unit 6050. The actuator operation amount setting unit 6000 corresponds to the functional block implemented by the ECU 4000. Usually, the function of the actuator operation amount setting unit 6000 is exhibited by executing the control routine according to a predetermined program stored in advance in the ECU 4000 in predetermined control cycles.

The valve phase detection unit 6010 calculates the actual phase IV(θ) of the intake valve 1100 (hereinafter, referred to as the "actual intake valve phase IV(θ)) based on the crank angle signal Pca from the crank angle sensor 5000, the cam angle signal Piv from the camshaft position sensor 5010, and the motor rotational angle signal Pmt from the rotational angle sensor 5050 for the electric motor 2060.

The valve phase detection unit 6010 calculates the current phase IV(θ) of the intake camshaft 1120 based on the crank angle signal Pca and the cam angle signal Piv. For example, the current valve phase IV(θ) is calculated, when the cam angle signal Piv is produced, by converting the time difference between the production of the cam angle signal Piv and the production of the crank angle signal Pca into the rotational phase difference between the crank shaft 1090 and the intake cam shaft 1120 (first phase calculation method).

Alternatively, with the intake VVT mechanism 2000 according to the embodiment of the invention, it is possible to accurately keep a track of the amount of change in the intake valve phase based on the operation amount (the relative rotational speed ΔNm) of the electric motor 2060 that serves as the actuator. More specifically, the actual relative rotational speed ΔNm is calculated based on the signals output from the sensors, and the amount of the change dIV(θ) in the intake valve phase per unit time (during one control cycle) is then calculated by the calculation process based on the calculated actual relative rotational speed ΔNm. Accordingly, the valve phase detection unit 6010 may successively calculate the current phase IV(θ) of the intake camshaft 1120 by accumulating the phase change amounts dIV(θ) (second phase calculation method). The valve phase detection unit 6010 may calculate the current valve phase IV(θ) by appropriately using the first phase calculation method or the second phase calculation method in consideration of, for example, the stability of the engine speed and the calculation load on the ECU.

The camshaft phase change amount calculation unit 6020 includes a calculation unit 6022 and a required phase change amount calculation unit 6025. The calculation unit 6022 calculates the deviation ΔIV(θ) (ΔIV(θ)=IV(θ)−IV(θ)r) of the actual intake valve phase IV(θ) from the target phase IV(θ)r. The required phase change amount calculation unit 6025 calculates the amount Δθ by which the phase of the intake camshaft 1120 is required to change (hereinafter, referred to as the "required phase change amount Δθ for the intake camshaft 1120") in the current control cycle based on the deviation ΔIV(θ) calculated by the calculation unit 6022.

For example, the maximum value of the required phase change amount Δθ in a single control cycle is set in advance. The required phase change amount calculation unit 6025 sets the required phase change amount Δθ, which corresponds to the deviation ΔIV(θ) and which is equal to or smaller than the maximum value. The maximum value may be a fixed value. Alternatively, the maximum value may be variably set by the required phase change amount calculation unit 6025 based on the operating state of the engine 1000 (the engine speed, the intake air amount, etc.) and the deviation ΔV(θ) of the actual intake valve phase IV(θ) from the target phase IV(θ)r.

The relative rotational speed setting unit 6030 calculates the rotational speed ΔNm of the output shaft of the electric motor 2060 relative to the rotational speed of the sprocket 2010 (the intake camshaft 1120). The relative rotational speed ΔNm needs to be achieved in order to obtain the required phase chance amount Δθ calculated by the required phase change amount calculation unit 6025. For example, the relative rotational speed ΔNm is set to a positive value (ΔNm>0) when the phase of the intake valve 1100 is advanced. On the other hand, when the phase of the intake valve 1100 is delayed, the relative rotational speed ΔNm is set to a negative value (ΔNm<0). When the current phase of the intake valve 1100 is maintained (Δθ=0), the relative rotational speed ΔNm is set to a value substantially equal to zero (ΔNm=0).

The relationship between the required phase change amount Δθ per unit time ΔT corresponding to one control cycle and the relative rotational speed ΔNm is expressed by Equation 1 shown below. In Equation 1, R(θ) is the speed reduction ratio that changes in accordance with the phase of the intake valve 1100, as shown in FIG. 9.

$$\Delta\theta \propto \Delta Nm \times 360° \times (1/R(\theta)) \times \Delta T \qquad \text{Equation 1}$$

According to Equation 1, the relative rotational speed setting unit 6030 calculates the rotational speed ΔNm of the electric motor 2060 relative to the rotational speed of the sprocket 2010, the relative rotational speed ΔNm being required to be achieved to obtain the required phase change amount Δθ of the camshaft during the control cycle ΔT.

The camshaft rotational speed detection unit 6040 calculates the rotational speed of the sprocket 2010, namely, the actual rotational speed IVN of the intake camshaft 1120 by dividing the rotational speed of the crankshaft 1090 by two. Alternatively, the camshaft rotational speed detection unit 6040 may calculate the actual rotational speed IVN of the intake camshaft 1120 based on the cam angle signal Piv from the camshaft position sensor 5010. Generally, the number of cam angle signals output during one rotation of the intake camshaft 1120 is smaller than the number of crank angle signals output during one rotation of the crankshaft 1090. Accordingly, the accuracy of detection is enhanced by detecting the camshaft rotational speed IVN based on the rotational speed of the crankshaft 1090.

The rotational speed command value preparation unit 6050 prepares the rotational speed command value Nmref for the electric motor 2060 by adding the actual rotational speed IVN of the intake camshaft 1120, which is calculated by the camshaft rotational speed detection unit 6040, to the relative rotational speed $\Delta$Nm set by the relative rotational speed setting unit 6030. A signal indicating the rotational speed command value Nmref, which is prepared by the rotational speed command value preparation unit 6050, is transmitted to the electric-motor EDU 4100. Thus, the feedback control loop 7000 for the intake valve phase, shown in FIG. 12, is accomplished.

The electric-motor EDU 4100 executes the rotational speed control such that the rotational speed of the electric motor 2060 matches the rotational speed command value Nmref. For example, the electric-motor EDU 4100 controls the on/off state of a power semiconductor element (e.g. a transistor) to control the electric power supplied to the electric motor 2060 (typically, the magnitude of electric current Imt passing through the electric motor and the amplitude of the voltage applied to the electric motor) based on the deviation (Nmref−Nm) of the actual rotational speed Nm of the electric motor 2060 from the rotational speed command value Nmref. For example, the duty ratio used in the on/off operation of the power semiconductor element is controlled.

In order to control the electric motor 2060 more efficiently, the electric-motor EDU 4100 controls the duty ratio DTY that is the adjustment amount by which the electric power supplied to the electric motor 2060 is controlled, according to Equation 2 shown below.

$$DTY=DTY(ST)+DTY(FB) \quad \text{Equation 2}$$

In Equation 2, DTY(FB) is a feedback term based on the control calculation using the above-described deviation and a predetermined control gain (typically, common P control or PI control).

DTY(ST) in Equation 2 is a preset term that is set based on the rotational speed command value Nmref for the electric motor 2060, and the calculated relative rotational speed $\Delta$Nm, as shown in FIG. 13.

Figure 14:
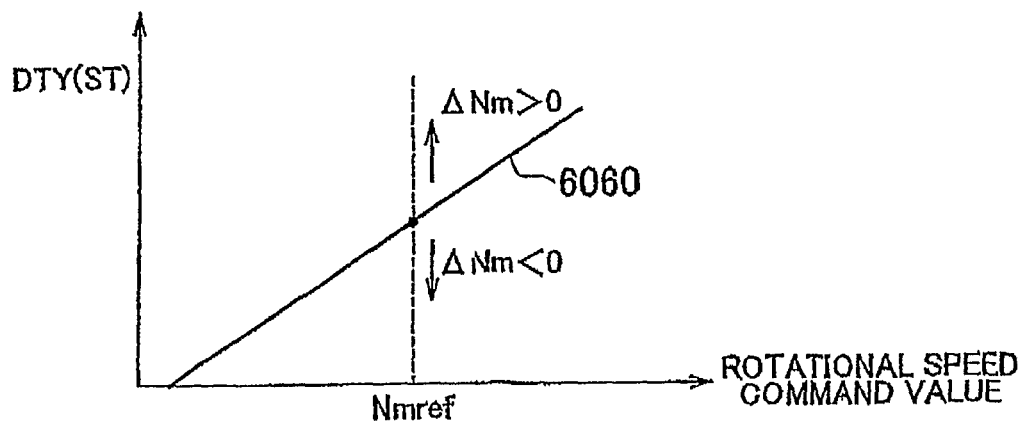
FIG. 14 is a graph illustrating the rotational speed control over an electric motor.

FIG. 14 is a graph illustrating the rotational speed control over the electric motor 2060. As shown in FIG. 14, a duty ratio characteristic 6060 corresponding to the motor current value required when the relative rotational speed $\Delta$Nm is zero ($\Delta$Nm=0), namely, when the electric motor 2060 is rotated at the same rotational speed as the sprocket 2010 based on the rotational speed command value Nmref is presented in a table in advance. DTY(ST) in Equation 2 is set based on the duty ratio characteristic 6060. Alternatively, DTY(ST) in Equation 2 may be set by relatively increasing or decreasing the value of the duty ratio corresponding to the relative rotational speed $\Delta$Nm from the reference value based on the duty ratio characteristic 6060.

The rotational speed control, in which the electric power supplied to the electric motor 2060 is controlled using both the preset term and the feedback term in combination, is executed. In this way, the electric-motor EDU 4100 causes the rotational speed of the electric motor 2060 to match the rotational speed command value Nmref, even if it changes, more promptly than in a simple feedback control, namely, the rotational speed control in which the electric power supplied to the electric motor 2060 is controlled using only the feedback term DTY(FB) in Equation 2.

Figure 15:
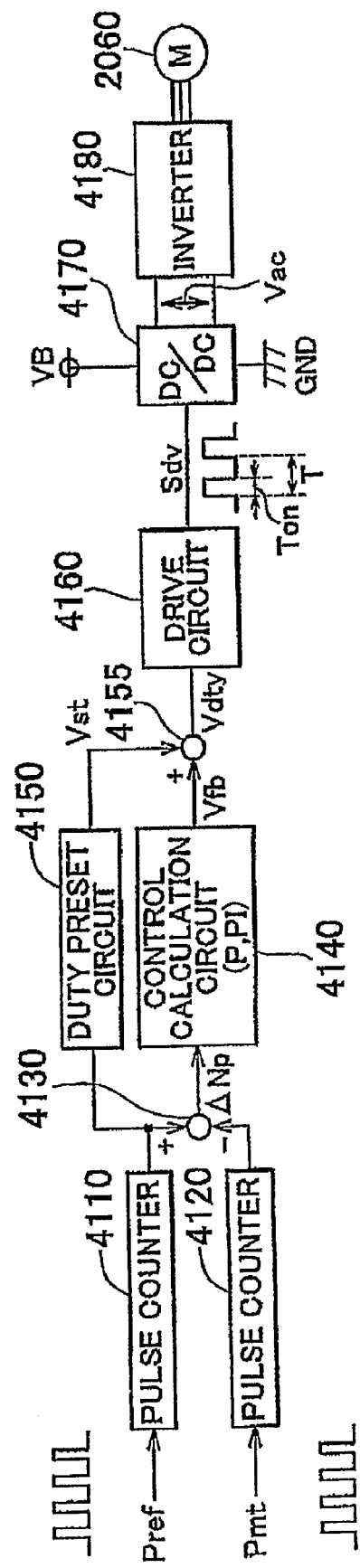
FIG. 15 is a functional block diagram illustrating the configuration of an electric-motor EDU.

FIG. 15 is a functional block diagram illustrating the configuration of the electric-motor EDU 4100. As shown in FIG. 15, the electric-motor EDU 4100 includes pulse counters 4110 and 4120, a subtraction circuit 4130, a control calculation circuit 4140, a duty preset circuit 4150, an addition circuit 4155, a drive circuit 4160, a DC/DC converter 4170, and an inverter 4180.

The pulse counter 4110 counts the number of pulses of the pulse signal Pref indicating the rotational speed command value Nmref from the ECU 4000. The pulse signal Pref has a frequency corresponding to the rotational speed command value Nmref. The pulse counter 4120 counts the number of pulses of the motor rotational angle signal Pmt. The subtraction circuit 4130 outputs a signal indicating the difference $\Delta$Np between the number of pulses counted by the pulse counter 4110 and the number of pulses counted by the pulse counter 4120. Namely, the signal output from the subtraction circuit 4130 corresponds to the deviation of the rotational speed of the electric motor 2060 from the rotational speed command value Nmref.

The control calculation circuit 4140 outputs a signal indicating the adjustment amount based on the deviation of the rotational speed of the electric motor 2060 from the rotational speed command value Nmref, namely, the control voltage Vfb that indicates the feedback term DTY(FB) in Equation 2 according to a known control calculation method, for example, P control or PI control. The duty preset circuit 4150 outputs a signal indicating the control voltage Vst that indicates the preset term DTY in Equation 2 based on the duty ratio characteristic 6060 shown in FIG. 14, according to the signal output from the pulse counter 4110.

The addition circuit 4155 outputs a signal indicating the control voltage Vdty that is the sum of the control voltage Vfb indicated by the signal from the control calculation circuit 4140 and the control voltage Vst indicated by the signal from the duty preset circuit 4150. The control voltage Vdty is the voltage indicating the duty ratio DTY in Equation 2.

The DC/DC converter 4170 is formed of, for example, a chopper circuit. The source voltage VB is stepped up or stepped down in accordance with the duty ratio of the power semiconductor element in the circuit. The inverter 4180 is formed of, for example, a common three-phase inverter, and applies an alternating-current voltage of which the peak amplitude matches the output voltage Vac from the DC/DC converter 4170.

The drive circuit 4160 controls the duty ratio (DTY) of the drive control signal Sdv for the power semiconductor element in the DC/DC converter 4170 in accordance with the control voltage Vdty from the addition circuit 4155. Thus, the feedback control loop 7100 for the motor rotational speed, shown in FIG. 12, is accomplished.

In the intake valve phase control executed by the variable valve timing system according to the embodiment of the invention described above, the electric-motor EDU 4100 controls the rotational speed of the electric motor 2060, as the minor loop that is a part of the feedback control executed by the ECU 4600 over the intake valve phase.

Accordingly, both the electric-motor EDU 4100 and the ECU 4000 which are the control units for the actuator can execute the valve timing control at a high speed by controlling the electric motor 2060 which serves as the actuator at a high speed without complicating their functions or causing an excessive increase in the processing load.

As described above, the ECU 4000 includes memory (RAM, ROM) that stores the programs, maps, etc., and the central processing unit (CPU) that executes the programs. Therefore, the control process executed by the ECU 4000 is basically a software process. On the other hand, the control process executed by the electric-motor EDU 4100 is preferably implemented by means of hardware, for example, an electronic circuit which is IC-compatible (integrated circuit-compatible). This makes it possible to control the rotational speed of the electric motor 2060 at a higher speed. Therefore, it is possible to enhance the control stability of the entire feedback control over the intake valve phase.

In the embodiment of the invention, the ECU 4000 may be regarded as a "first controller" according to the invention, and the electric-motor EDU 4100 may be regarded as a "second controller" according to the invention. The control calculation circuit 4140 shown in FIG. 15 may be regarded as a "first setting unit" according to the invention, the duty preset circuit 4150 in FIG. 15 may be regarded as a "second setting unit" according to the invention, the drive circuit 4160 in FIG. 15 may be regarded as a "drive unit" according to the invention, and the DC/DC converter 4170 in FIG. 15 may be regarded as an "electric power conversion circuit" according to the invention.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A variable valve timing system that changes opening/closing timing of at least one of an intake valve and an exhaust valve provided in an engine, comprising:
    a changing mechanism that changes the opening/closing timing of the valve by an amount of change corresponding to a rotational speed of an electric motor that is used as an actuator relative to a rotational speed of a camshaft that drives the valve;
    a first sensor that detects the rotational speed of the camshaft;
    a second sensor that detects the rotational speed of the electric motor;
    a first controller that calculates a current value of the opening/closing timing of the valve based on at least a signal from the first sensor and a signal from the second sensor, and that prepares a rotational speed command value for the electric motor based on a deviation of the current value of the opening/closing timing from a target value of the opening/closing timing, which is set based on an operating state of the engine, such that the opening/closing timing changes in accordance with the target value; and
    a second controller that receives a signal indicating the rotational speed command value from the first controller, and controls an electric power supply to the electric motor based on the rotational speed of the electric motor, which is detected by the second sensor, such that the electric motor operates in accordance with the rotational speed command value;
    wherein the second controller controls the rotational speed of the electric motor by executing, in combination, a setting control based on the rotational speed command value set by the first controller and a feedback control based on a deviation of the actual rotational speed of the electric motor from the rotational speed command value.

2. The variable valve timing system according to claim 1, wherein
    the second controller includes:
    an electric power conversion circuit that controls the electric power supply to the electric motor;
    a first setting unit that sets an adjustment amount by which an amount of electric power supplied to the electric motor is controlled based on the deviation of the rotational speed of the electric motor, which is detected by the second sensor, from the rotational speed command value indicated by the signal from the first controller;
    a second setting unit that sets an adjustment amount in accordance with the rotational speed command value indicated by the signal from the first controller based on a predetermined characteristic; and
    a drive unit that prepares a control signal for the electric power conversion circuit based on a sum of the adjustment amount set by the first setting unit and the adjustment amount set by the second setting unit.

3. The variable valve timing system according to claim 2, wherein
    the adjustment amount is a duty ratio used to control the amount of electric power supplied to the electric motor.

4. The variable valve timing system according to claim 1, wherein
    the second controller is formed integrally with the electric motor and includes the second sensor, and the first controller receives the signal indicating the rotational speed of the electric motor from the second sensor via a signal line that extends from the first controller to the second controller.

5. The variable valve timing system according to claim 1, wherein
    the first controller is formed of an electronic control unit that has a function of executing a program to control the engine.

* * * * *